April 13, 1926.
M. L. QUICK
1,580,856
APPARATUS FOR COOLING MILK AND OTHER LIQUIDS
Filed May 23, 1922
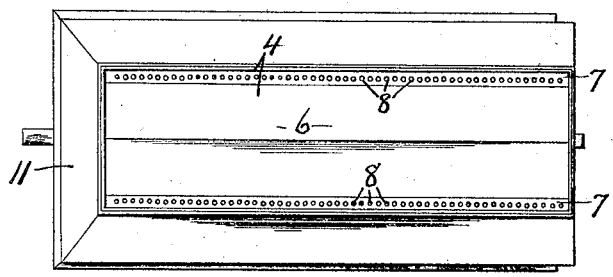
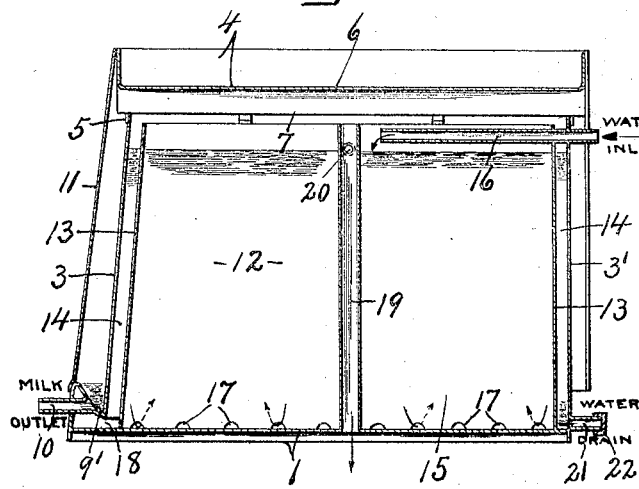
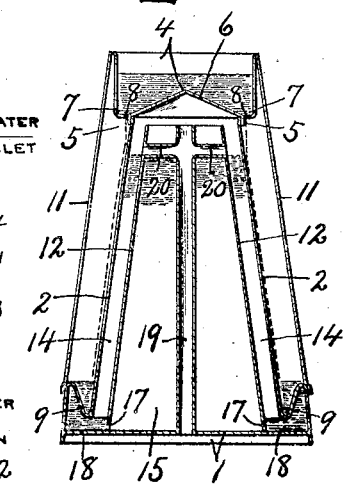
INVENTOR
M. L. Quick
BY
ATTORNEYS.

Patented Apr. 13, 1926.

1,580,856

UNITED STATES PATENT OFFICE.

MORRIS L. QUICK, OF FULTON, NEW YORK.

APPARATUS FOR COOLING MILK AND OTHER LIQUIDS.

Application filed May 23, 1922. Serial No. 563,001.

*To all whom it may concern:*

Be it known that I, MORRIS L. QUICK, a citizen of the United States of America, and a resident of Fulton, in the county of Oswego, in the State of New York, have invented new and useful Improvements in Apparatus for Cooling Milk and Other Liquids, of which the following, taken in connection with the accompanying drawings, is a full, clear, and exact description.

This invention relates to an apparatus for cooling milk and other liquids, the main object being to automatically and expeditiously vary the temperature of any liquid through any practicable range by causing said liquid to flow by gravity in a thin film over a cooling surface of relatively large area and at the same time to provide means whereby the cooling surface may be maintained at the desired temperature.

One of the specific objects is to reduce the animal heat of fresh milk to the legally required temperature for transportation or working into other products.

Another specific object is to provide a comparatively small apparatus with relatively large cooling surfaces arranged in downwardly diverging planes with a feeding hopper at the top capable of discharging the fresh milk in thin films directly against the upper portions of the cooling surface across which the films may gravitate to an underlying cooling trough at the bottom where the cooled milk is drawn off into suitable receptacles as fast as it is delivered to the trough.

Other objects and uses relating to the method and apparatus will be brought out in the following description:

In the drawings:

Figure 1 is a top plan of one form of apparatus for carrying out the objects of my invention.

Figures 2 and 3 are, respectively, a longitudinal sectional view and a transverse sectional view of the same apparatus.

The apparatus shown is preferably made of sheet metal and comprises a substantially rectangular base —1— and opposed cooling walls —2— extending upwardly from the base —1— in converging planes to substantially the same height but in transversely spaced relation so that the outer surface of each wall inclines downwardly and outwardly to form impact surfaces against which the milk or other liquid is caused to impinge near the top and to flow downwardly and across in the form of thin films as will be hereinafter more fully explained.

The opposite ends of the cooling walls —2— are united by end walls —3— and —3'— extending from the base —1— to the same height as the side walls thereby forming a complete receptacle of which the base —1— forms the bottom.

A substantially rectangular hopper —4— is removably supported upon the upper edges of the side and end walls of the main receptacle and serves not only as a receptacle for the milk or other liquid to be cooled but also forms a cover normally closing the top of the receptacle, the bottom of the hopper being provided with a downwardly projecting marginal flange —5— adapted to fit around and against the upper edges of the sides —2— and end walls —3— and —3'— to hold the hopper against lateral displacement relatively to the receptacle.

The intermediate portion of the bottom as —6— of the hopper —4— is arched upwardly transversely so that its highest point extends along the longitudinal center, while the remaining portions incline downwardly and outwardly from said longitudinal center to deflect the milk or other liquid toward the sides, which latter extend short distances beyond the adjacent upper edges of the corresponding sides —2— of the receptacle and form with the incline portions of the bottom —6— suitable troughs —7—.

The bottoms of the troughs —7— lie just beyond the outer faces of the upper edges of the cooling walls —2— and are provided with lengthwise rows of small apertures —8—, which are disposed in parallel vertical planes nearly coincident with the outer faces of the upper edges of the side walls —2— so that when the fresh milk or other liquid is poured into the hopper —4—, it will pass by gravity through the apertures in relatively small jets close together and impinge against the outer faces of the upper edges of the walls —2— and will then flow by gravity downwardly across said surface in the form of thin films throughout practically the entire areas of said walls, and it therefore, follows that if the walls are kept cool, the milk flowing across their outer faces will be reduced to substantially the same temperature, while at the same time, the spreading out of the milk in the form of a thin film over said surface in the presence of atmospheric air will produce an aerating effect upon the milk, all of which contribute to the expeditious reduction of the fresh milk to the desired temperature.

The walls —2— are provided near their lower ends with collecting troughs —9— for receiving the cooled films of milk as they gravitate downwardly across the outer surface of the walls —2—, both of said troughs being closed at one and the same end while their opposite ends communicate with a transverse trough —9'— extending across the outer face of the end wall —3— near the lower edge thereof but in substantially the same horizontal plane or slightly lower than that of the troughs —9—, which may be slightly inclined toward the transverse trough —9'— to allow the cooled liquid to flow thereinto and thence through an outlet —10— into any suitable receptacle not shown.

An outer casing —11— is supported at its lower edge upon the upper outer edges of the troughs —9— and 9'— to extend along the side walls —2— and across the end wall —3— in spaced relation thereto and also to extend to the top of and against the outer faces of the corresponding sides and end wall of the hopper —4— for the purpose of excluding dust and other foreign matter from the milk or other liquids as they gravitate downwardly across the outer faces of the walls —2—.

Otherwise, the casing —11— is unattached to any of the other parts of the apparatus and may be removed by upward displacement without disturbing the main receptable or its hopper —4— and in fact may be dispensed with where the main receptacle is located in a room free from floating dust or other foreign matter.

Rising from the base —1— within the side walls —2— and end walls —3— and —3'— are additional upwardly converging side walls —12— and end walls —13— in spaced relation to the adjacent side and end walls to form an intervening cooling chamber —14— of relatively shallow transverse width extending from the base —1— to a horizontal plane just below the under side of the bottom —6— of the hopper —4— or slightly below the horizontal plane of the upper edges of the side walls 2 and end walls —3— and —3'—.

These walls —12— and —13— constitute an enclosure for a primary cooling chamber —15— to which cold water or other cooling liquid is introduced near the top through a supply conduit —16— which, in this instance extends horizontally through the end wall —3'— directly below the longitudinal center of the bottom of the hopper —4— and may be connected to any available source of cold water supply.

The lower edges of the side walls —12— are provided with apertures —17— for establishing communication between the primary cooling chamber —15— and secondary cooling chamber —14— near the base —1— to allow the cooling agent to pass from the chamber —15— into the chamber —14—.

The lower edges of the side walls —2— and end wall —3— at their junctions with the troughs —9— and —9'— are spaced a short distance from the bottom of the base —1— to form intervening passages —18— which allow the water to circulate under and along the outer walls of the troughs —9— and 9'— throughout their entire length for additionally cooling the liquid in the troughs which are preferably formed by bending the lower edges of the side walls —2— and end wall —3— upwardly and outwardly where they are united to the up-turned marginal edges of the base —1— by soldering or other suitable fastening means capable of forming a water tight joint with the base.

An over-flow or outlet pipe —19— is secured at its lower end to and extends through the base —1— centrally thereof and also extends upwardly therefrom within the chamber —15— to approximately the upper ends of the side walls —12— where it is provided with overflow branches —20— extending through the side walls —12— to communicate with the chamber —14—, said branches being disposed in a horizontal plane slightly below that of the water inlet —16— and serve to determine the level of the cooling liquid in both of the chambers —14— and —15— so that when the apparatus is in use for cooling milk or other liquid, both chambers will be substantially filled from the base —1— to a level a relatively short distance below the bottom of the hopper —4— and by reason of the overflow branches —20— and downflow pipe —19—, this body of water may be kept in circulation or in a cool condition as long as fresh cool water is supplied through the inlet —16—.

*Operation.*

When the apparatus is to be used for cooling milk or other liquids, cold water is permitted to flow continuously through the pipe —16— into the primary cooling chamber —15— and through the passages —17— into the secondary cooling chamber —14—, thereby filling both chambers and also the space at the bottom and outside of the troughs —9— and —9'— until the liquid reaches the level of the over-flow branches —20— through which it escapes into the conduit —19— and thence downwardly and outwardly into a waste pipe or any suitable receptacle provided therefor.

While this cooling liquid is in circulation, the fresh milk or other liquid to be cooled is poured or otherwise introduced into the hopper —4— from which it passes through the opposite rows of relatively small openings —8— against the outer faces of the upper portion of the cooling walls —2— and thence downwardly across and upon said walls in a thin film to the underlying troughs —9— from which it flows into the trough —9'— and thence through the outlet pipe —10— into a suitable receptacle, not shown.

By the use of this apparatus, it is evident that the liquid is cooled by causing it to flow by gravity across the outer faces of both of the walls —2— in the form of a thin film which is instantly cooled in transit to the troughs —9,— the entire operation being simple and expeditious and may be continued indefinitely or until the entire batch of fresh milk on hand is cooled.

When the operation is completed, the water may be drawn off from both of the chambers —14— and —15— through a drainage outlet —21— which is preferably located in the end wall —3'— near the bottom of the base —1,— said outlet being provided with a cap —22— whereby it may be closed during the circulation of the water through the chambers —14— and —15— for cooling purposes.

While I have described an apparatus for cooling milk and other liquids, it is evident that the same apparatus might be used for raising the temperature of liquid by introducing a heating liquid into the chambers —14— and —15— through the supply pipe —16,— and therefore, I do not wish to limit myself to the cooling of liquids but rather to the broader use of changing the temperature of liquids.

What I claim is:—

1. In a liquid cooling apparatus of the character described, a hollow upright shell having a water-containing chamber, means for introducing water into said shell, an additional upright shell surrounding the sides and ends of the first-named shell in spaced relation thereto to form an intervening cooling chamber, connecting passages between the lower ends of said chambers for permitting the circulation of water from one chamber to the other, an overflow passage near the upper end of said chambers for maintaining a predetermined level of the water therein, means for projecting the liquid to be cooled against the outer surfaces of the upper portion of the outer shell to enable said liquid to gravitate downwardly across said surfaces, and collecting troughs projecting outwardly from the lower edges of the outer walls for receiving the cooled liquid.

2. In a liquid cooling apparatus of the character described, a hollow upright shell having a water-containing chamber, means for introducing water into said shell, an additional upright shell surrounding the sides and ends of the first-named shell in spaced relation thereto to form an intervening cooling chamber, connecting passages between the lower ends of said chambers for permitting the circulation of water from one chamber to the other, an overflow passage near the upper end of said chambers for maintaining a predetermined level of the water therein, means for projecting the liquid to be cooled against the outer surfaces of the upper portion of the outer shell to enable said liquid to gravitate downwardly across said surfaces, collecting troughs projecting outwardly from the lower edges of the outer walls for receiving the cooled liquid, and a dust-protective casing extending around the outer shell in spaced relation thereto and having its lower edges resting upon the outer edges of said troughs.

3. In a liquid cooling apparatus of the character described, an upright water-containing chamber, a cooling chamber surrounding the first-named chamber and communicating at its lower end therewith to permit the passage of water from one chamber to the other, means for introducing water into the inner chamber, an overflow connected to the upper portion of the cooling chamber to determine the level of the water in both chambers, means for projecting the liquid to be cooled against the upper portion of the outer surface of the outer walls of the cooling chamber, and hollow troughs at the lower edges of the cooling chamber for receiving the cooled liquid.

4. In a liquid cooling apparatus of the character described, an upright water-containing chamber, a cooling chamber surrounding the first-named chamber and communicating at its lower end therewith to permit the passage of water from one chamber to the other, means for introducing water into the inner chamber, an overflow connected to the upper portion of the cooling chamber to determine the level of the water in both chambers, means for projecting the liquid to be cooled against the upper portion of the outer surface of the outer walls of the cooling chamber, hollow troughs at the lower edges of the cooling chamber for receiving the cooled liquid and a dust-protective casing surrounding the outer walls of the cooling chamber in spaced relation thereto and having its lower edges resting upon the outer edges of said troughs.

In witness whereof I have hereunto set my hand this 17th day of May 1922.

MORRIS L. QUICK.